United States Patent
Michael et al.

(10) Patent No.: US 9,026,903 B1
(45) Date of Patent: May 5, 2015

(54) ABSTRACT SYNTAX TREE INTERPRETER FOR GENERATING A VALID HTML DOCUMENT

(75) Inventors: Constantinos Michael, New York, NY (US); Steffen Meschkat, Zurich (CH); Tobias Boonstoppel, New York, NY (US); Stefan Haustein, Zurich (CH)

(73) Assignee: Google Inc., Mountain View, CA (US)

( * ) Notice: Subject to any disclaimer, the term of this patent is extended or adjusted under 35 U.S.C. 154(b) by 543 days.

(21) Appl. No.: 13/253,780

(22) Filed: Oct. 5, 2011

Related U.S. Application Data

(60) Provisional application No. 61/431,735, filed on Jan. 11, 2011, provisional application No. 61/449,583, filed on Mar. 4, 2011.

(51) Int. Cl.
G06F 17/00 (2006.01)
G06F 17/24 (2006.01)

(52) U.S. Cl.
CPC .................................... G06F 17/248 (2013.01)

(58) Field of Classification Search
CPC ...................................................... G06F 17/248
USPC ......................................................... 715/235
See application file for complete search history.

(56) References Cited

U.S. PATENT DOCUMENTS

| | | |
|---|---|---|
| 6,263,352 B1 | 7/2001 | Cohen |
| 6,738,804 B1 | 5/2004 | Lo |
| 6,938,205 B1 | 8/2005 | Hanson et al. |
| 6,981,212 B1 | 12/2005 | Claussen et al. |
| 7,093,193 B1 | 8/2006 | Goldberg |
| 7,111,231 B1 | 9/2006 | Huck et al. |
| 7,640,512 B1 | 12/2009 | Appling |
| 7,685,609 B1 | 3/2010 | McLellan |
| 7,698,321 B2 | 4/2010 | Hackworth |
| 7,844,894 B2 | 11/2010 | Khopkar et al. |
| 7,958,232 B1 | 6/2011 | Colton et al. |
| 2002/0188631 A1 | 12/2002 | Tiemann et al. |
| 2003/0221184 A1 | 11/2003 | Gunjal et al. |
| 2004/0111671 A1 | 6/2004 | Lu et al. |
| 2004/0187080 A1 | 9/2004 | Brooke et al. |
| 2004/0199497 A1 | 10/2004 | Timmons |
| 2005/0022174 A1* | 1/2005 | Lauterbach et al. .......... 717/148 |
| 2005/0060317 A1 | 3/2005 | Lott et al. |
| 2005/0107206 A1 | 5/2005 | Lott et al. |
| 2005/0289178 A1 | 12/2005 | Angus |
| 2006/0107206 A1 | 5/2006 | Koskimies |

(Continued)

OTHER PUBLICATIONS

Stoker, "Toucan: A Configurable Web Site Maintenance Tool", Dissertation, 2001, University of Sheffield, 44 pages.*

(Continued)

*Primary Examiner* — Amelia Tapp
(74) *Attorney, Agent, or Firm* — Dority & Manning, P.A.

(57) ABSTRACT

A system, method, and a computer-readable medium for generating a valid HTML document. The method includes receiving a request from a browser and, in response, providing an abstract syntax tree, the abstract syntax tree including a plurality of nodes, where each node represents an element in a template file. The method also includes, traversing the abstract syntax tree, and for each node in the tree determining a type of the node and performing an action based on the node type. The method further includes generating the valid HTML document based on the plurality of actions and sending the valid HTML document for display to a browser.

20 Claims, 9 Drawing Sheets

(56) References Cited

U.S. PATENT DOCUMENTS

| | | | |
|---|---|---|---|
| 2006/0212804 A1 | 9/2006 | Jackson et al. | |
| 2006/0242575 A1 | 10/2006 | Winser | |
| 2007/0033280 A1 | 2/2007 | Popp et al. | |
| 2007/0050407 A1 | 3/2007 | Chen et al. | |
| 2007/0078810 A1 | 4/2007 | Hackworth | |
| 2007/0233902 A1 | 10/2007 | Trefler et al. | |
| 2008/0028302 A1* | 1/2008 | Meschkat | 715/255 |
| 2008/0040653 A1 | 2/2008 | Levine | |
| 2008/0077653 A1 | 3/2008 | Morris | |
| 2008/0133722 A1 | 6/2008 | Ramasundaram et al. | |
| 2008/0275951 A1 | 11/2008 | Hind et al. | |
| 2009/0019386 A1 | 1/2009 | Sweetland et al. | |
| 2009/0063499 A1 | 3/2009 | Koinuma et al. | |
| 2010/0037150 A1 | 2/2010 | Sawant | |
| 2010/0058467 A1 | 3/2010 | Ivory et al. | |
| 2010/0070566 A1 | 3/2010 | Vandewalle | |
| 2010/0306738 A1 | 12/2010 | Verma et al. | |

OTHER PUBLICATIONS

Meschkat, "jstemplate.js", source code file retrieved from http://google-jstemplate.googlecode.com/svn/trunk, copyright 2006 Google Inc., p. 1-13.*

Meschkat, "util.js", source code file retrieved from http://google-jstemplate.googlecode.com/svn/trunk, copyright 2006 Google Inc., p. 1-6.*

Varda, "Protocol Buffers: Google's Data Interchange Format" retrieved from http://google-opensource.blogspot.com/ "Open Source at Google", published Jul. 7, 2008, p. 1-13.*

Meschkat, "Simple and robust browser side template processing for Ajax based web applications" WWW 2008, Apr. 21-25, 2008, Beijing, China, p. 1-7.*

Meschkat, "jsevalcontext.js", source code file retrieved from http://google-jstemplate.googlecode.com/svn/trunk, copyright 2006 Google Inc., p. 1-6.*

Meschkat, "jstemplate_test.js", source code file retrieved from http://google-jstemplate.googlecode.com/syn/trunk, copyright 2006 Google Inc., p. 1-6.* http://google-jstemplate.googlecode.com/svn/trunk, 1 page, discloses a listing of source code files for jstemplate.*

Kolbitsch et al., "Transclusions in an HTML-Based Environment", Journal of Computing and Information Technology—CIT 14, 2006, 2, 161-174.*

Nelson et al., "Back to the Future: Hypertext the Way It Used to Be" HT'07, Sep. 10-12, 2007, Manchester, United Kingdom, p. 227-228.*

Bernstein, "Shadows in the Cave: hypertext transformations" Journal of Digital Information, vol. 10, No. 3 (2009), p. 1-10.*

Sivonen, et al., "Assembling Web Pages Using Document Trees", Helsinki University of Technology, published Apr. 3, 2004, p. 1-28.*

Potencier, "Templating Engines in PHP", Oct. 7, 2009, p. 1-26, retrieved from http://fabien.potencier.org/article/34/templating-engines-in-php.*

De Vries et al., "Design and Implementation of a PHP Compiler Front-end", Sep. 21, 2007, p. 1-19.*

"How to process OCL Abstract Syntax Trees", p. 1-15, retrieved from Internet Archive Wayback Machine Capture dated Aug. 23, 2007, at https://web.archive.org/web/20070823204245/http://www.eclipse.org/articles/article.php?file=Article-HowToProcessOCLAbstractSyntaxTrees/index.htm.*

Hoffman, Thad, Using XML Data Islands in Mozilla, Plus Linked Files, The Mozilla Organization, Apr. 3, 2003, archived Sep. 9, 2004 http://www.mozi II a.org/xmlextras/xm ldataislands/ (19 pages).

"HSP/EzStor Tutorial" Copyright 2003 EzTools Software, archived Jun. 3, 2009 http://www.eztoolssoftware.com/tutorials/hsp/hsp howto 1 . Htm (8 pages).

McFarlane, Nigel, "Make Data Islands Work in All Browsers", archived Feb. 5, 2006, http://www.devx.com/webdev/Article/28898 (9 pages).

Goodman, Brett, "Client-side ASP scripting with HTML Scripting Pages" Copyright 2000-2001, http://www. aspfree .co m/c/a/ ASP /C I ie nts ide -ASP-scripting -with-HTM L-Scripting-Pages/ (4 pages).

Jacobs, James Q., "XML Data Binding"© 2004, http://www-jgjacobs.net/web/xml/xml_data_binding.html (3 pages).

Wisman, Raymond, "Client-side XML", archived Jun. 6, 2008, http://homepages.ius.edu/rwisman/n341 /htmi/XML.htm (6 pages).

Kaur et al., "An Evaluation of Protocol Buffer," Proceedings of IEEE SoutheastCon 2010, Mar. 18-21, 2010, pp. 459-462 (4 pages).

Co-Pending U.S. Appl. No. 13/245,823, Michael et al., filed Sep. 26, 2011 (not published) (41 pages).

Office Action mailed Nov. 17, 2011 in U.S. Appl. No. 13/245,823, Michael et al., filed Sep. 26, 2011 (13 pages).

Co-pending U.S. Appl. No. 13/245,831, Michael et al., filed Sep. 26, 2011 (not published) (35 pages).

Office Action mailed Dec. 9, 2011, in U.S. Appl. No. 13/245,831, Michael et al., filed Sep. 26, 2011 (14 pages).

Co-Pending U.S. Appl. No. 13/253,696, Meschkat et al., filed Oct. 5, 2011 (not published) (35 pages).

Office Action mailed Dec. 12, 2011, in U.S. Appl. No. 13/253,696, Meschkat et al., filed Oct. 5, 2011 (11 pages).

Co-Pending U.S. Appl. No. 13/253,663, Michael et al., filed Oct. 5, 2011(not published) (36 pages).

Office Action mailed Dec. 16, 2011, in U.S. Appl. No. 13/253,663, Michael et al., filed Oct. 5, 2011 (11 pages).

Co-Pending U.S. Appl. No. 13/253,780, Michael et al., filed Oct. 5, 2011(not published) (37 pages).

Office Action mailed Dec. 20, 2011, in U.S. Appl. No. 13/253,780, Michael et al., filed Oct. 5, 2011 (11 pages).

Co-Pending U.S. Appl. No. 13/253,814, Michael et al., filed Oct. 5, 2011 (not published) (22 pages).

Office Action mailed Feb. 21, 2012, in U.S. Appl. No. 13/253,814, Michael et al., filed Oct. 5, 2011 (8 pages).

"Jstemplates: Quick example," accessed at http://code.google.com/p/google-jstemplate/source/browsel?r=10, 71 pages (Aug. 19, 2008).

"Open HTML from Kindle file system w/ browser," MobileRead Forums, MobileRead.com, discussion extending from May 1, 2009 to May 3, 2009, accessed at http://www.mobileread.com/forums/printthread.php?s=287962ca817c56df47bd0a254ba201f6&t= 45969, accessed on Jul. 16, 2016, 1 page.

"Possible to Lead an Array from a File?—comp.lang.javascript," Google Groups, discussion extending from Nov. 15, 2002-Nov. 17, 2002, accessed at https://groups.google.com/group/comp.lang.javascript!browse_thread/thread/ac4fc6ff989fbe58?hl=en &noredirect=true&pli=1, accessed on Jul. 11, 2012, 4 pages.

Brabrand, Claus et al., "Language-based Caching of Dynamically Generated HTML," in World Wide Web: Internet Web and Information Systems, Kluwer Academic Publishers, Netherlands, pp. 305-323 (2002).

Edwards, Dean, "How to Load and Parse XML Data Without ActiveX," accessed at http://dean.edwards.name/weblog/2006/04/easyxml/, accessed on May 30, 2012, 6 pages (published Apr. 2006).

Fox, Joshua et al., "Hyper-programming Web Applications," in Proceedings of the Second Australian Undergraduate Students' Computing Conference, AUSCC, pp. 59-66 (2004).

Malabarba, Scott et al., "Runtime Support for Type-Safe Dynamic Java Classes," in Lecture Notes in Computer Science (LNCS), Elisa Bertino Ed., Springer-Verlag, Berlin, Germany, pp. 337-361 (2000).

Office Action mailed Jun. 11, 2012, in U.S. Appl. No. 13/253,696, Meschkat et al., filed Oct. 5, 2011, 16 pages.

Office Action mailed May 25, 2012 in U.S. Appl. No. 13/253,663, Michael et al., filed Oct. 5, 2011, 12 pages.

Office Action mailed Apr. 19, 2012 in U.S. Appl. No. 13/245,823, Michael et al., filed Sep. 26, 2011, 11 pages.

Office Action mailed Sep. 17, 2012 in U.S. Appl. No. 13/245,823, Michael et al., filed Sep. 26, 2011, 11 pages.

Office Action mailed Apr. 4, 2012 in U.S. Appl. No. 13/245,831, Michael et al., filed Sep. 26, 2011, 23 pages.

Co-Pending U.S. Appl. No. 13/407,431, Michael et al., filed Sep. 26, 2011 (not published).

\* cited by examiner

ABSTRACT SYNTAX TREE INTERPRETER FOR GENERATING A VALID HTML DOCUMENT

This application claims the benefit of U.S. Provisional Application No. 61/431,735, filed on Jan. 11, 2011 and is incorporated by reference in its entirety. This application also claims the benefit of U.S. Provisional Application No. 61/449,583, filed on Mar. 4, 2011 and is incorporated by reference in its entirety.

BACKGROUND

The emergence and development of computer networks and protocols, such as the Internet and the World Wide Web (or simply "web" or "Web"), allow users to download and display dynamic webpages on their own computers. One way to display the data content in a webpage is to include data into templates. Templates maintain the layout and design of a webpage while webpage updates its content.

Conventional template processing systems do not generate valid HTML documents using compiled template objects and abstract syntax trees. Moreover, conventional template processing systems do not include an interpreter that generates a valid HTML document by traversing the abstract syntax tree and causing template objects to generate a valid HTML document.

BRIEF SUMMARY

Methods, systems, and computer program products are disclosed to generate a valid HTML document.

According to an embodiment, a method for generating a valid HTML document is provided. The method includes receiving a request from a browser. In response to the request, the method provides an abstract syntax tree, the abstract syntax tree including a plurality of nodes, and each node representing an element in a template file. The method also includes, traversing the abstract syntax tree, and for each node in the abstract syntax tree determining a type of the node and performing an action based on the node type. The method further includes generating the valid HTML document based on the plurality of actions and sending the valid HTML document for display to a browser.

According to another embodiment, a system for generating a valid HTML document. The system includes a memory configured to store an abstract syntax tree, the abstract syntax tree including a plurality of nodes, each node in the plurality of nodes representing an HTML element. The system also includes an interpreter configured to traverse the abstract syntax tree and for each node in the abstract syntax tree, determine a type of the node and perform an action based on the node type using one or more compiled template objects, and generate the valid HTML document based on the plurality of actions. The system may also include a communication interface configured to receive a request from a browser and in response send the valid HTML document for display on the browser.

According to yet another embodiment, an article of manufacture including a computer-readable medium having instructions stored thereon that cause the computing device to perform operations for generating a valid HTML document if provided. The operations may include receiving a request from a browser. In response to the request, the operations provide an abstract syntax tree, the abstract syntax tree including a plurality of nodes, and each node representing an element in a template file. The operation may also include, traversing the abstract syntax tree, and for each node in the abstract syntax tree determining a type of the node and performing an action based on the node type. The operations may further include generating the valid HTML document based on the plurality of actions and sending the valid HTML document for display to a browser.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure 4:
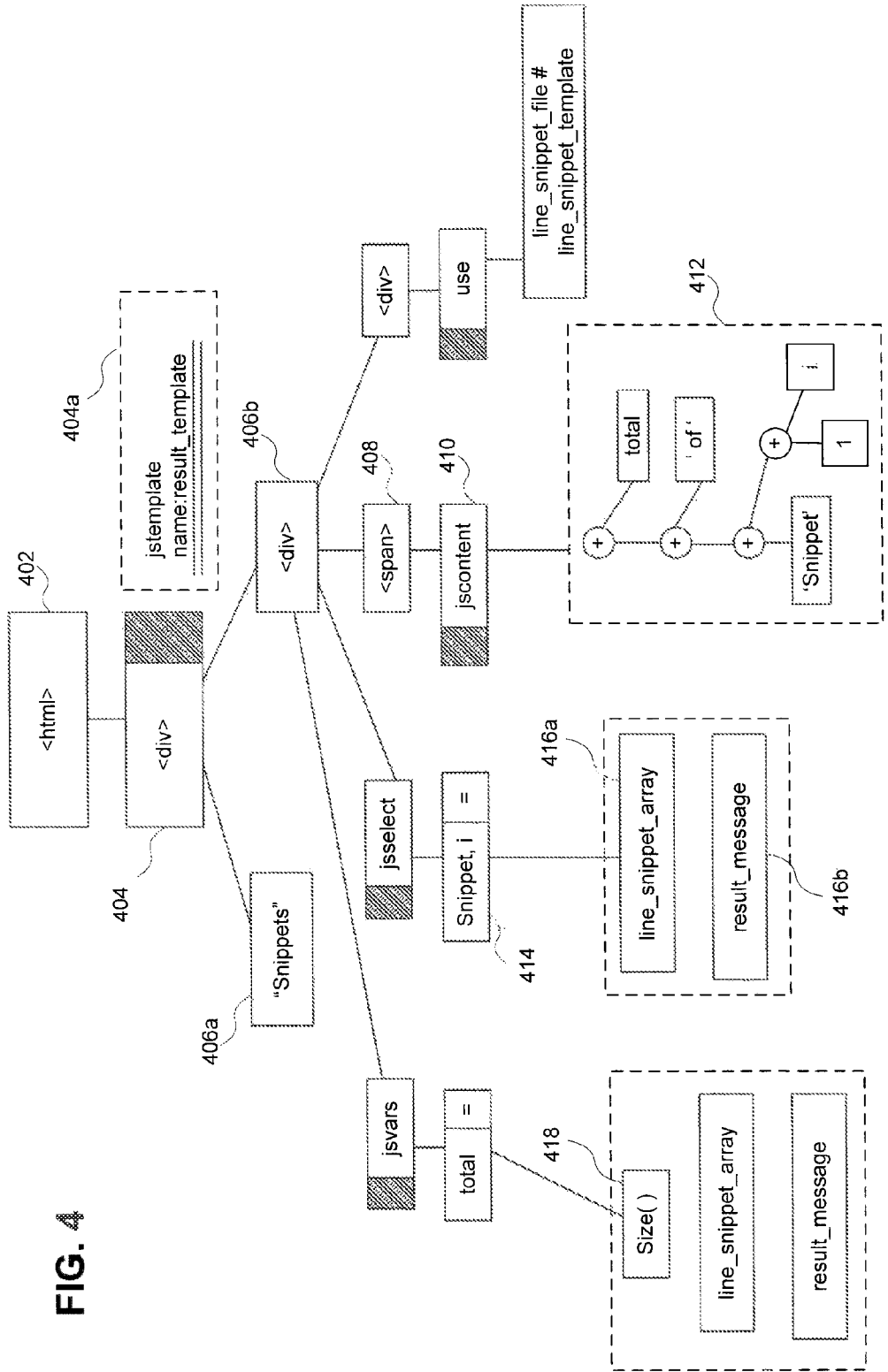

FIG. 4. is an exemplary embodiment of an AST tree.

Figure 5:
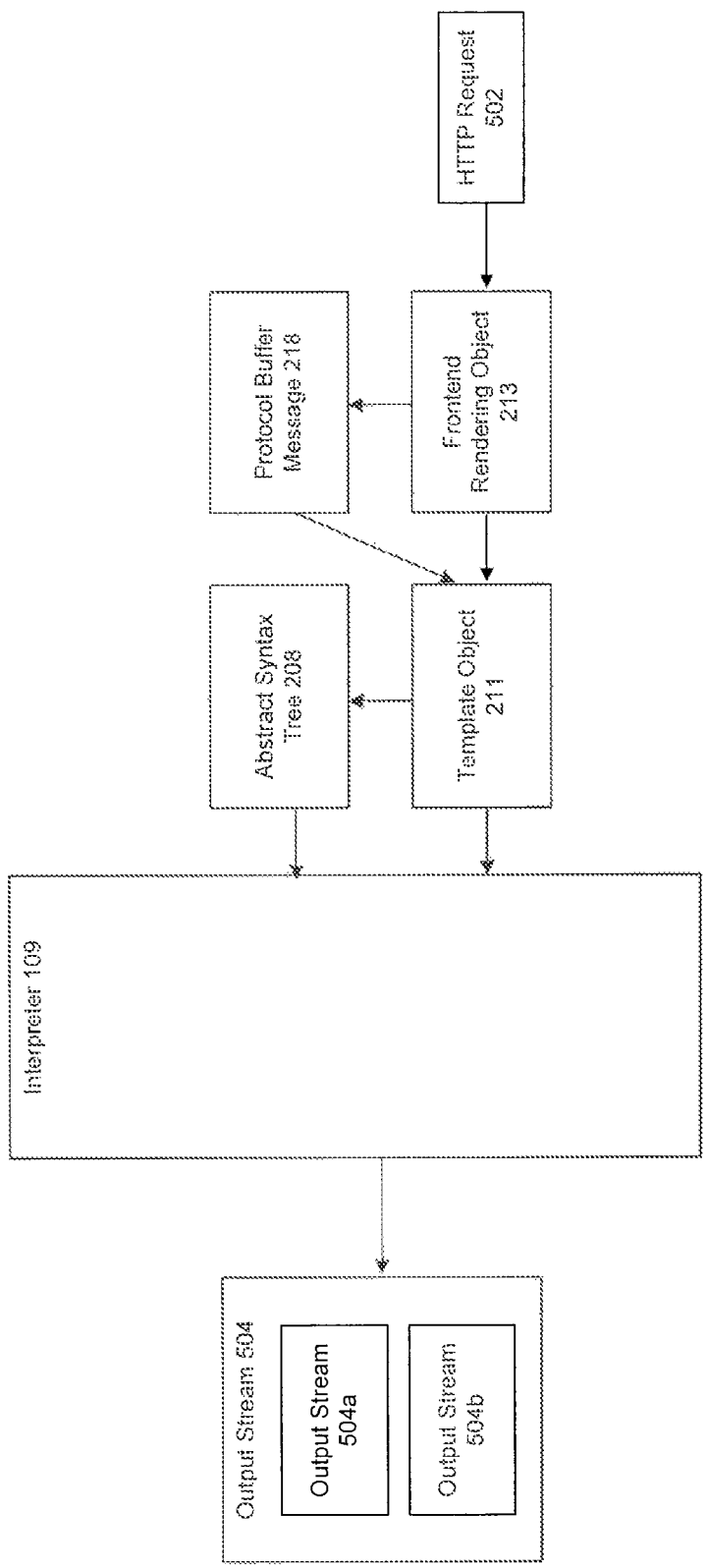

FIG. 5 is a block diagram of a valid HTML document being generated.

Figure 6:
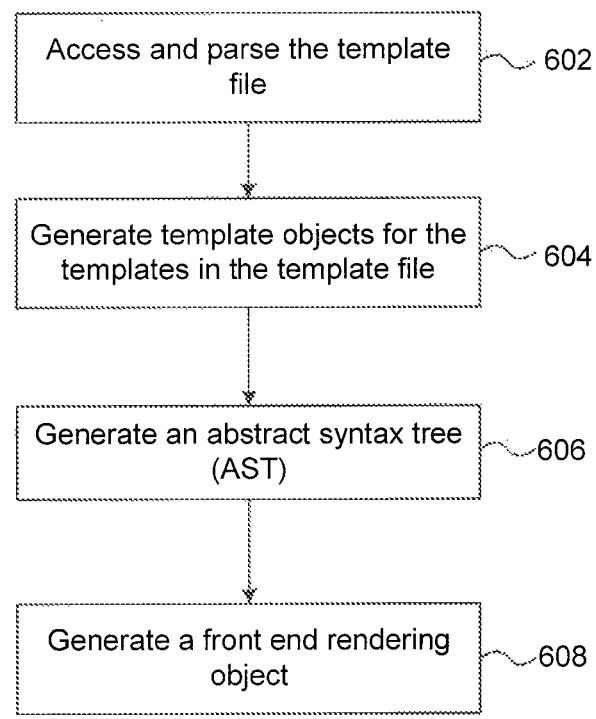

FIG. 6 is a flowchart of an exemplary method for generating a template object and a corresponding abstract syntax tree.

Figure 7:
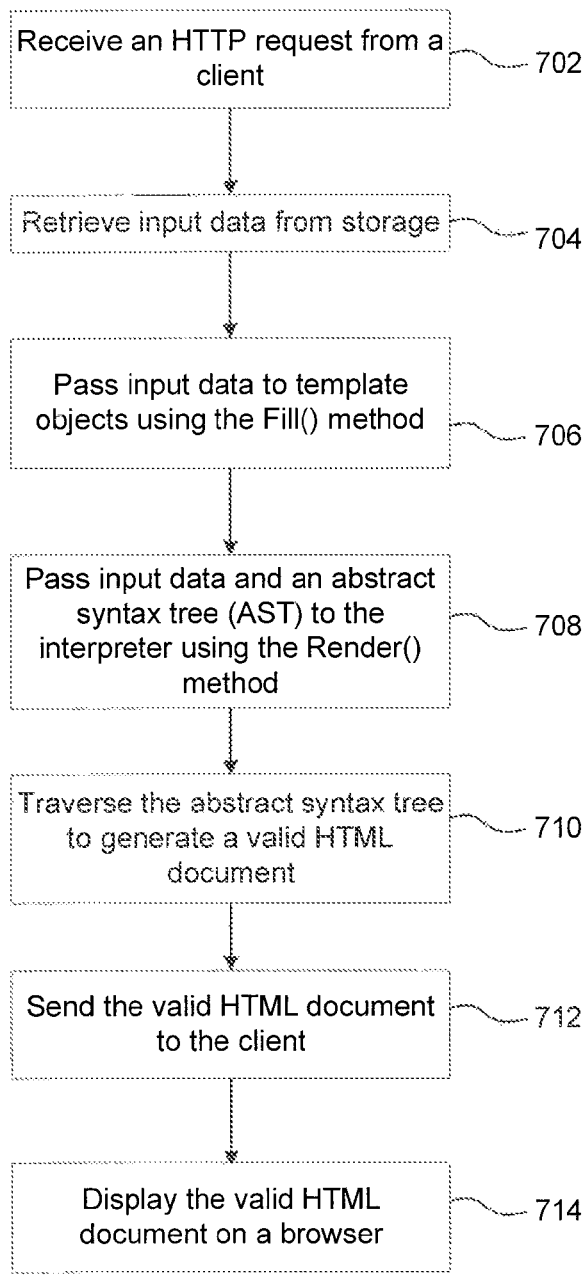

FIG. 7 is a flowchart of an exemplary method for generating a valid HTML document using a web server.

Figure 8:
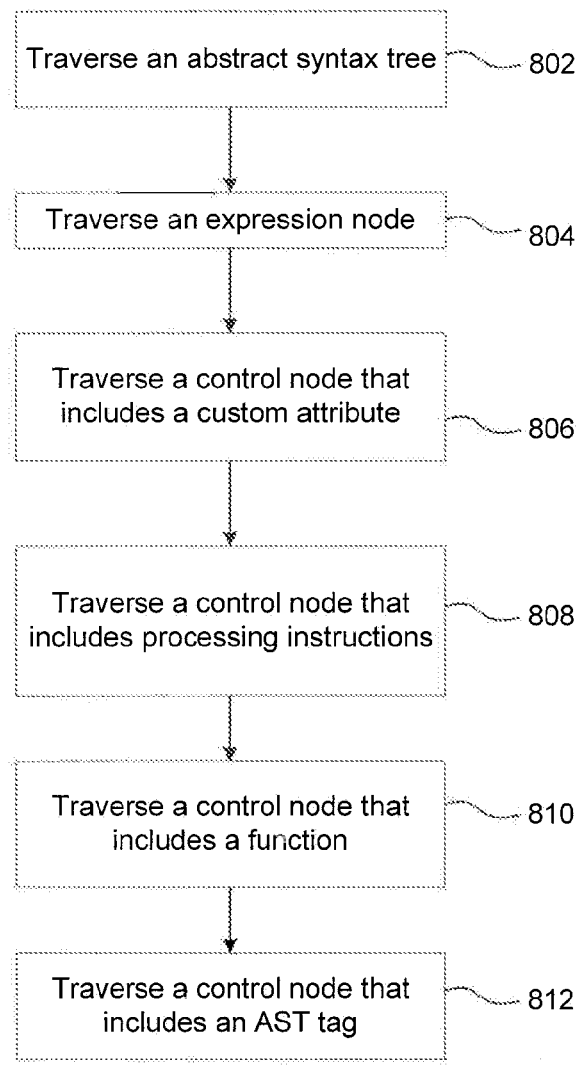

FIG. 8 is a flowchart of an exemplary embodiment of a method traversing an abstract syntax tree.

Figure 9:
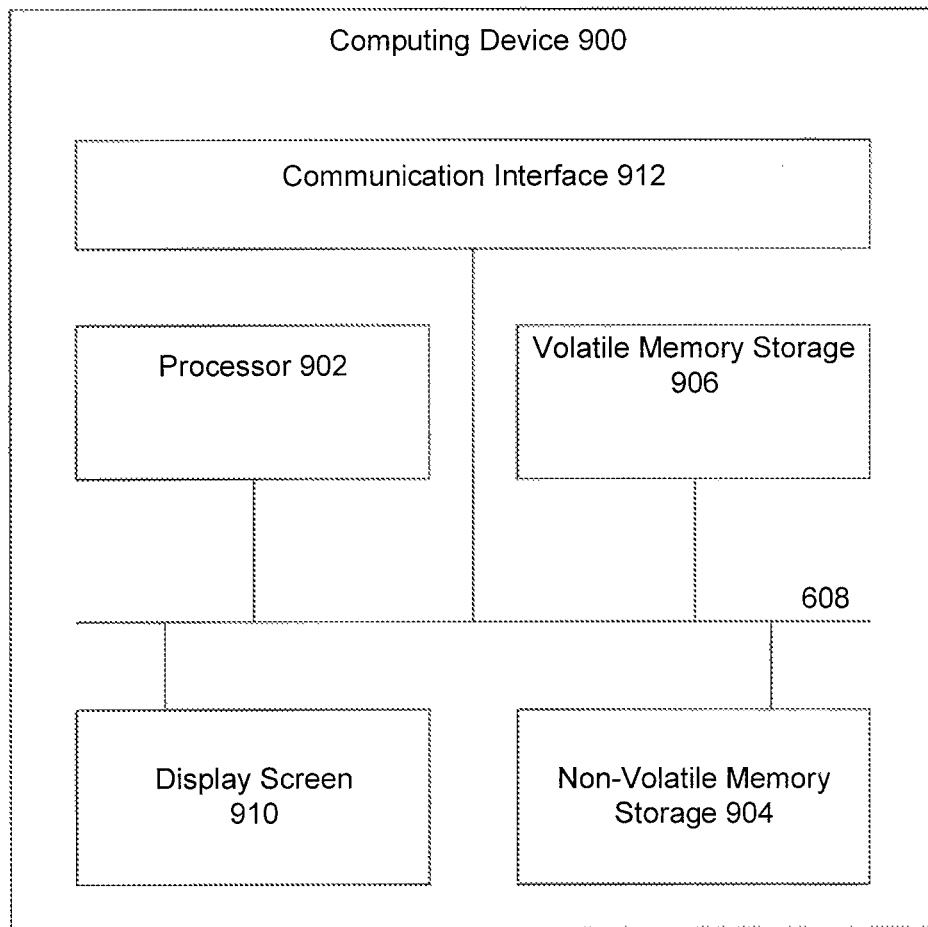

FIG. 9 is a block diagram of an exemplary computing environment.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Figure 1:
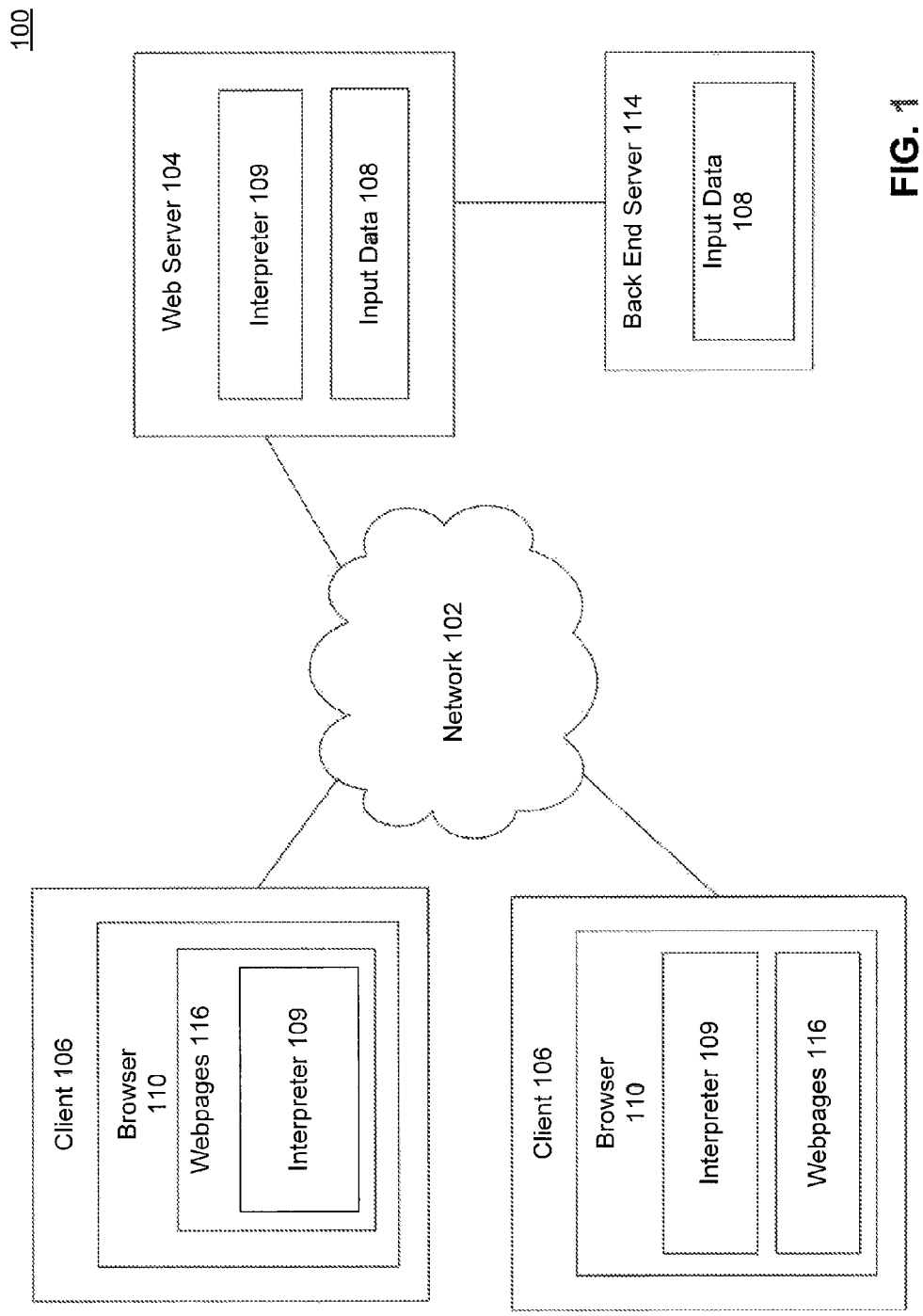
FIG. 1 is a block diagram of an exemplary system of an environment capable of generating a valid HTML document.

FIG. 1 is a block diagram of an exemplary system 100 of an environment capable of generating a valid HTML document. System 100 includes a network 102, a web server 104 and a client 106. Network 102 connects client 106 and web server 104. System 100 may include many thousands of web servers 104 and clients 106.

Network 102 may be any network or combination of networks that can carry data communication. Such a network 102 may include, but is not limited to, a local area network, metropolitan area network, and/or wide area network such as the Internet. Network 102 can support protocols and technology including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving and storing resources. Resources can be provided over network 102. Resources include data inserted into hypertext markup language (HTML) pages, word processing documents, portable document format (PDF) documents, images, video, and feed sources, to name only a few. Web server 104 also includes input data 108. Input data 108 is data content that client 106 requests from web server 104.

In an embodiment, web server 104 includes an interpreter 109. Interpreter 109 and template building module (described below) are components of a template processing system that builds and compiles programs that produce a valid HTML documents. When web server 104 receives a hypertext transfer protocol (HTTP) request from client 106, web server 104 uses interpreter 109 to generate a valid HTML document that includes valid HTML and valid input data 108.

Backend server 114 is a database or a storage repository that stores input data 108. In an embodiment, web server 104 retrieves input data from web server 104 when it receives an HTTP request for a webpage 116. Web server 104 uses network 102 to retrieve input data 108 from backend server 114.

Client 106 is an electronic computing device capable of requesting and receiving resources over network 102. Example clients 106 are personal computers, mobile communication devices, (e.g. smart phones, tablet computing devices, notebooks), set-top boxes, game-console embedded systems, and other devices that can send and receive input data 108 over network 102. To display input data 108, client 106 may execute an application, such as a browser 110.

Browser 110 is an application that executes on client 106. Browser 110 displays HTML documents as webpages 116 to a user. In an embodiment, browser 110 can be a browser such as CHROME browser from Google, Inc.

In one embodiment, browser 110 also includes interpreter 109. Interpreter 109 processes custom attributes that web server 104 may include in the valid HTML document, and generates webpage 116 that browser 110 displays on a display screen. On client 106 side, browser 110 may have a plug-in for interpreter 109. In another embodiment, browser 110 includes interpreter 109 when browser 110 is installed on client 106. In another embodiment, interpreter 109 may be built into browser 110. In another embodiment, interpreter 109 may be a library that is included in webpage 116 and delivered to browser 110 from web server 104.

Figure 2:
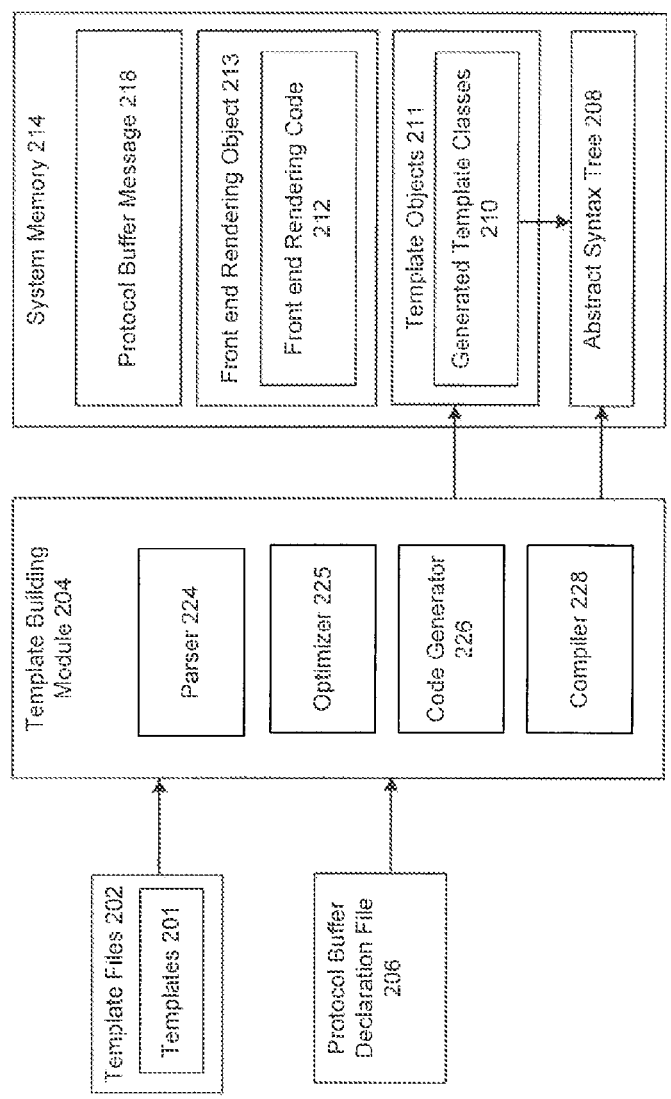
FIG. 2 is a block diagram of an exemplary embodiment of a template building module.

FIG. 2 is an exemplary embodiment 200 of a template building module. Template building module 204 builds and compiles text and binary template objects that render a valid HTML document when executed by interpreter 109. Template building module 204 may build and compile template objects 201 on any computing device. For example, template building module 204 may exist on a computing device that a webpage developer uses to create webpage 116.

Unlike conventional systems, template processing system decouples the template building and compilation process from the rendering process. During the building and compilation process, template building module 204 uses templates 201 in template files 202 to generate abstract syntax trees (ASTs) 208, template classes 210 and template objects 211. ASTs 208 and template objects 211 are uploaded to web server 104 and are executed by interpreter 208 when web server 104 receives a request, such as an HTTP request, for webpage 116, from browser 110. When web server 104 receives such a request, interpreter 109 initiates a rendering process. During the rendering process, interpreter 109 combines template objects 211 with input data 108 and creates a valid HTML document. Browser 110 uses this HTML document to render webpage 116.

In an embodiment, template object 211 is created from template 201 in template file 202. Template 201 typically includes formatted code, such as HTML markup code, processing instructions, expressions and custom attributes that are interpreted by template building module 204. Template 201 may be statically modified by being loaded into an HTML editor or browser 110 prior to the building and compilation process.

Template building module 204 compiles and builds a template object 211 from template 201. During the compilation and building process, template building module 204 binds the input parameters included in template 201 to the definitions of the typed data structures that hold input data 108 during execution. In an embodiment, a typed data-structure is defined in protocol buffer definition file (".proto" file) 206.

Each data structure in ".proto" file 206 defines a record of information in series of name-value pairs fields with a specific data-type for each name. For example, each name is a type-defined primitive, such as an integer, a float, a string, etc., or another typed data structure. A compiler (not shown) compiles the data structure defined in ".proto" file 206 into a protocol buffer. During execution, the protocol buffer may be used as a protocol buffer message 218. Compiler also creates an application programming interface (API) that allows interpreter 109 to manipulate input data 108 stored in protocol buffer fields during runtime. A person skilled in the art will appreciate that the actual implementation of the API depends on the programming language, such as C++, Java or Python.

For example, ".proto" file "result.proto" below, includes protocol buffer "Result" and protocol buffer "Line Snippet." Protocol buffer "Result" includes a protocol buffer of data-type "LineSnippet." Protocol buffer "LineSnippet" includes data-types "string" and an unsigned integer, such as "int32".

```
message Result {
    repeated LineSnippet line_snippet_array=1;
}
message LineSnippet {
    optional string text=1;
    optional int32 id=2;
    optional string type=3;
}
```

A developer identifies data structures that pass input data 108 to template objects 211 by including a path to the file defining the data structure, such as ".proto" file 206.

When template building module 204 attempts to compile and build template object 211, it identifies the location of ".proto" file 206 and a data-type of the included data structures and its fields. Template building module 204 binds the data types of the data-structure and its field to the input parameters included in templates 201 that are set to receive input data 108 from the data structure. The binding causes the input parameter to inherit the data-type of the data structure, and as a result have a data-type. The binding eliminates data-type mismatches during runtime and guarantees to produce a valid HTML document.

Template 201 also includes custom attributes. Each custom attribute includes template processing directives. In a non-limiting example, custom attributes may include, as explained in further detail below, jsimport, jstemplate, jscontent, jsselect, jsvar and jsif, to name only a few. Exemplary template processing directives include static expressions that may be a subset of JavaScript. During runtime, interpreter 109 uses processing instructions to evaluate input data 108 and determine the placement of input data 108 in the valid HTML document. Template processing directives may also determine whether some, all or no input data 108 is displayed by the valid HTML document.

One example of a custom attribute is jsimport. Jsimport stores a location of ".proto" file 206 that template 201 uses to obtain input data 108. For example, <html jsimport="maps/jslayout/result.proto">

In the example above, "maps/jslayout/result.proto/" specifies a path to ".proto" file 206 from which type definitions may be accessed.

Another example of a custom attribute is jstemplate. Jstemplate is a custom attribute that identifies template 201 to template building module 204 during build time. Jstemplate also declares protocol buffer message 218 that compiled template object 211 expects to receive during runtime. For example, <div jstemplate="line_snippet_template;
        snippet:maps_jslayout.LineSnippet">

In the example above, template "snippet" expects input data 108 from protocol buffer message "LineSnippet" included in namespace maps_jslayout.

Custom attribute jstemplate also indicates for template building module 204 to bind the data-type of the input parameter in template 201 to the typed data structure. For example, template building module 204 should bind the input parameter "snippet" to protocol buffer message "LineSnippet." As a result, input parameter "snippet" inherits the data-type of protocol buffer message "LineSnippet."

Another example of a custom attribute is jscontent. During execution, custom attribute jscontent indicates to interpreter 109 to substitute the content of HTML element in template 201 with a value of input data 108 specified in protocol buffer message 218. For example, <span jscontent="snippet.text"></span>

In the example above, the text that is inserted between HTML tag <span> and <span> is the value of field "text", in the input parameter "snippet". As described herein, input parameter "snippet" may be used because template building module 204 bound it to data-type defined for protocol buffer "LineSnippet."

Another example of a custom attribute is jsvalues. Jsvalues sets an HTML attribute to a value of the field in the input parameter. For example, <div jsvalues="id:snippet.type+snippet.id">

In the example above, tag <div> includes text that has values from the field "type" and the value from the field "id" included in the input parameter "snippet."

In another example, a combination of custom attributes jsif and jscontent may specify conditions when specific template sections may be omitted or hidden in the valid HTML document. For example:

<div jsif="has('snippet.id')"
        jscontent="snippet.text"
        jsvalues="id:snippet.type+snippet.id">
        This text is replaced with snippet text.
    </div>

In the example above, valid HTML document displays the value of the fields "text" "type" and "id" from the input parameter "snippet" if the field "id" is set to a value.

Another example of a custom attribute is jsselect. Jsselect is an example of a for loop inside template 201. For example, jsselect iterates over an array in a protocol buffer "Result" and produces lines of input data 108, different input data 108 included on each line. For example, <div jstemplate="result_template; result_message:
        maps_jslayout.Result">
    Snippets:
    <div jsselect="snippet, i, total:
        result_message.line_snippet_array">
    <span jscontent="'snippet'+(1+i)+'of'+total">
    Text here is replaced with "snippet X of Y"
    </span>
    <div use="line_snippet_template_file.html#line_snippet_template">
    Text here is replaced with contents of transclusion.
    </div>
    </div>
    </div>

In the example above, the data-type of jstemplate input parameter "result_message" is bound to the data-type of the protocol buffer message "Result." Custom attribute jsselect iterates over the field "line_snippet_array" in the input parameter "result_message." The value of the field "result_message" is written into the input parameter "snippet." Jsselect uses "i" as a counter to keep track of the number of iterations performed on the input parameter "result.message." In the example above, for each snippet in "result_message" interpreter 109 generates a line "'snippet'+(1+i)+'of'+total" where 'i' indicates the number of snippets in the valid HTML document.

In another example, custom attributes are used to access compiled functions. For example, template 201 may specify a service, such as a remote procedure call (RPC) service, and pass protocol buffer message 218 to that service. During processing, interpreter 109 may render different content based on the result of an RPC call to a given service. In an embodiment, RPC service may return input data 108 in protocol buffer message 218 as a result. For example, <div jstemplate="search_form;
        browser_rules:webserver.BrowserRulesService">
    . . . .
    <div jsif="browser_rules.IsX( )"></div>

In the example above, template 201 renders a <div> tag only when browser 110 is of type 'X'.

In an embodiment, the interface for the RPC service may also be defined in ".proto" file 206. For the example above, an interface:

service BrowserRulesService {
        rpc IsX (EmptyMessage) returns (Boolean);
    } is included in ".proto" file 206.

In another embodiment, a developer uses custom attributes in template 201 to compose output from multiple templates (also known as "transclusion"). Transclusion occurs when a content of an element, such as an HTML element in one template, replaces a content of an element from another template. During compilation and building process, when template building module 204 performs a transclusion, it guarantees that when the transcluded template is transcluded into a transcluding template, the data-type of the input parameters of the transcluded template match the data-types passed to the transcluded template.

A person skilled in the art will appreciate that custom attributes and their corresponding utilization described herein are given by way of example and not limitation, and that there are other ways custom attributes may be utilized to expand dynamic functionality in template 201.

Template building module 204 includes a parser 224, an optimizer 225, a code generator 226 and a compiler 228. Parser 224 parses the HTML syntax in each template 201 included in template file 202, verifies that data-types of the input parameters are consisted with the data-types for input data 108, that paths to ".proto" files 206 and other external files are correct and that fields specified in template 201 for protocol buffer messages 218 exist in ".proto" file 206.

When parser 224 encounters a custom attribute in template 201, parser 224 also performs a syntactic analysis of the custom attribute. For example, parser 224 verifies that the syntax of each custom attribute is compatible with the format described herein.

Additionally, parser 224 parses the content of external files, such as external cascading style sheet (CSS) files, referenced in template file 202. Parser 224 may indicate to compiler 228 to inline the content of the CSS files in template objects 211, such that when the HTML document is created, the output stream contains the CSS from the external CSS files directly, and not by reference to the CSS.

Because parser 224 verifies that the data-type of each input parameter is consistent with the data-type of the data structure assigned to it, and the HTML syntax in each template 201, template processing system guarantees that compiled templates 201 produce a valid HTML document. In the valid HTML document input data 108 is properly nested when the HTML document is being displayed as a webpage 116 and when HTML tags are properly closed.

Parser 224 also generates AST 208 from template file 202. In an embodiment, AST 208 may be represented in a text file. In another embodiment, AST 208 may be a compiled, binary representation. In an embodiment, AST 208 may be represented as protocol buffer message 218.

AST 208 includes nodes. The topmost node in AST 208 is a root node. A root node is a parent node to the nodes below. The child nodes are nodes that have a parent node. In an embodiment, a root node of AST tree 208 is an entry point node. For example, a root node may include an <html> HTML tag included in template file 202. The endmost nodes in AST 208 are leaf nodes. Leaf nodes do not have any child nodes. In an embodiment, the leaf node may include textual expressions. The sibling nodes, are nodes in AST 208 that have the same parent node.

AST 208 includes nodes that are expression nodes and control nodes. An expression node may include text that is included inside HTML tags in template file 202. A control node may include an HTML tag, processing instructions, such as an arithmetic or logical expressions, a complex data structure, a custom attribute, a function call or call to another AST 208. Control nodes may also include one or more AST tags. Each AST tag include instructions that interpreter 109 executes before proceeding to the next node. For example, a control node that includes a custom attribute may include an AST tag that includes processing directives for that custom attribute. In another embodiment, an AST tag may include a root node of another AST 208.

Parser 224 generates AST 208 according to the HTML tags and other instructions included in HTML file. For example, an open HTML tag, such as <X> indicates a parent node. The HTML tags, the processing instructions, text expressions, etc. that are inside the HTML tag that is included in the parent node are children of that parent node. In an embodiment, each HTML tag, processing instruction, text expression, etc., are included in one node. When code generator 225 reaches the close HTML tag, such as </X>, code generator 225 completes the subtree associated with the HTML tag and begins to generate a sibling node for the next open HTML tag, expression, processing instruction, etc. at the same node level as the previous HTML tag. In an embodiment, parser 224 may not generate a separate node for a close HTML tag. In another embodiment, HTML tag may collapse an open HTML tag and close HTML tag and elements in between the open and close HTML tag into one node.

In an embodiment, parser 224 rewrites the fields in protocol buffer messages that are accessed by name, into a memory offset representation where the fields are accessed by an offset. For example, given the protocol buffer message:

message Result {
    repeated LineSnippet line_snippet_array=1;
}
message LineSnippet {
    optional string text=1;
    optional int32 id=2;
    optional string type=3;
}
for the expression:
result.line_snippet_array[3].id
and a stack where "result" is found at position 0, the memory offset representation in the stack is "stack[0][1][3][2]". For example, parser 224 rewrites an access to the field "id" in protocol buffer message LineSnippet from "result.line_snippet_array[3].id" to an offset representation such as "stack[0][1][3][2]". The offset representation "stack[0][1][3][2]" refers to the $2^{nd}$ field ('id') of the $3^{rd}$ instance of the $1^{st}$ repeated field (line_snippet_array) of the $0^{th}$ element in the stack (the variable named 'result'). During execution, when interpreter 109 retrieves input data 108 from a protocol buffer message 218, interpreter 109 retrieves input data 108 using the memory offset representation, which, in an embodiment, is more efficient.

Code generator 226 converts template 201 into a template class 210. In an embodiment, template class 210 has the same name as template 201. A person skilled in the art will appreciate that code generator 226 may generate template class 210 in C++, Java, Python or any other object oriented programming language known to a person skilled in the art.

Figure 3:
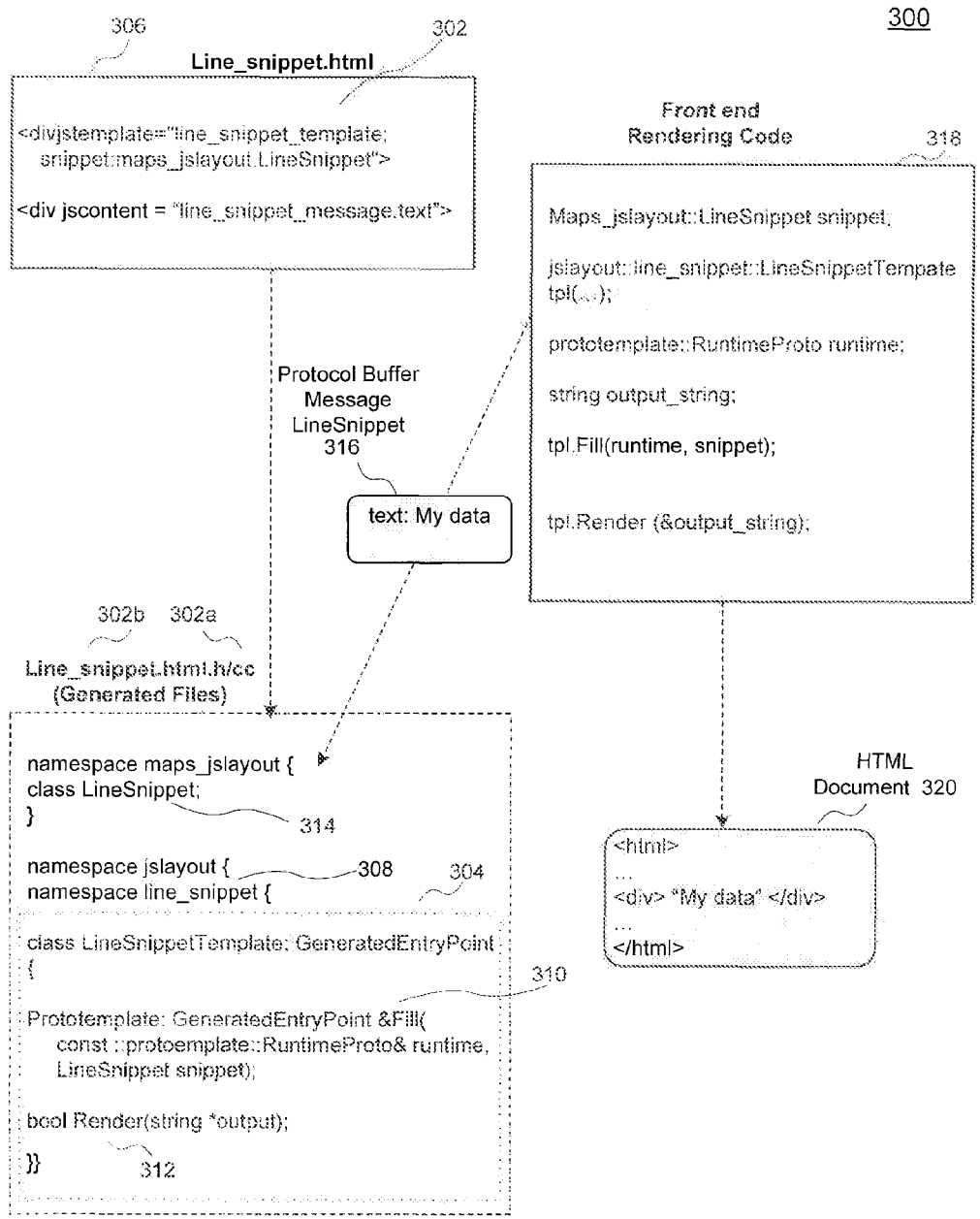
FIG. 3 is a block diagram of a template building module generating an example template class.

FIG. 3 is a block diagram 300 of a template building module generating a template class LineSnippetTemplate 304 for template "line_snippet_template" 302 in template file "line_snippet_file.html" 306. The code generation process, described herein, with references to FIG. 3.

In an embodiment, definitions and declarations for each template class 210 generated from each template 201 are stored in the definition and declaration files that correspond to the name of template 201. For example, in C++, code generator 226 generates template class LineSnippetTemplate 304 that is included in files "line_snippet_file.cc" 302a and "line_snippet_file.h" 302b from template file "line_snippet_file.html" 302. A person skilled in the art will appreciate that a ".h" file includes declaration of classes, subroutines, variable and other identifiers, while a ".cc" file includes actual implementation of the classes.

In an embodiment, code generator 226 generates a namespace for templates 201 included in template file 202. A person skilled in the art will appreciate that a namespace avoids a building conflict, such as, a conflict when compiler 228 attempts to compile templates 201 having the same name that are included in different template files 202 and template classes 210 that have the same name but different processing directives. In a further embodiment, namespace for template file 202 may be the name of template file 202. For example, for template file line_snippet_file.html "302, code generator 226 generates namespace line_snippet_file 308. Namespace line_snippet_file 308 includes class LineSnippetTemplate 304

In template class 210, code generator 226 includes a declaration for each protocol buffer message 218 included in template 201 in the ".h" file such as "line_snippet_file.h"

302*b*. For example, protocol buffer message "LineSnippet" may be declared as class LineSnippet 314.

In an embodiment, code generator 226 generates a Fill( ) method and a Render( ) method for each template class 210. The Fill( ) method passes protocol buffer message 218 to template class 210 during execution. Once template class 210 obtains protocol buffer message 218, template class 210 may retrieve input data 108 from fields included in protocol buffer message 218 and use input data 108 to evaluate expressions in custom attributes such as jsselect, jsif and jsvalues. For example, class LineSnippetTemplate 304 includes a Fill( ) method 310 that passes protocol buffer message LineSnippet 316 to template class LineSnippetTemplate 304.

The Render( ) method renders an output stream that, includes HTML and input data 108 received using protocol buffer messages 218. For example, class LineSnippetTemplate 304 includes a Render( ) method 312 that renders a valid HTML document 320.

Going back to FIG. 2, compiler 228 converts (compiles) template classes 210 and template rendering code 212 into template objects 211. In an embodiment, compiler 228 may be a C++ compiler. However, a person skilled in the art will appreciate that a compiler for other languages, such as Java may be used. Template objects 211 are binary objects that include computer executable code that reads and manipulates input data 108.

In addition to template classes 210, a template application developer writes front end rendering code 212. Front end rendering code 212 references a declaration for each template class 210, a code to initialize and compose protocol buffer message 218 that include input data 108, a call to a Fill( ) method that passes protocol buffer message 218 to template object 211 and a call to a Render( ) method to create an output string that composes a valid HTML document. FIG. 3, includes an example front end rendering code 318 for class LineSnippetTemplate 304.

In front end rendering code 318, a protocol buffer message "LineSnippet" is declared by "maps_jslayout::LineSnippet snippet." Front end rendering code 318 also declares protocol buffer message "LineSnippet" 316 that may be used to retrieve input data 108. After input data 108 is retrieved, protocol buffer messages "LineSnippet" 316 is passed to the LineSnippetTemplate's template object 211 using the "tpl. Fill( )" method 310. Subsequently, front end rendering code 318 uses "tpl.Render( )" method 312 to render an output stream that contains a valid HTML document 320.

Going back to FIG. 2, after application developer completes writing front-end rendering code 212, using compiler 228 compiles the front end rendering code 212 into a front end rendering object 213.

FIG. 4. is an exemplary embodiment of an AST 400 generated for a "result_template" template included in a file "result_template_file.html." Below is the HTML and custom attributes included in "result_template file.html."

<html jsimport="template/prototemplate/jslayout/examples/snippet/result.proto">
  <div jstemplate="result_template; result_message: maps_jslayout.Result">
  Snippets:
  <div jsvars="total:size('result_message.line_snippet_array')"
    jsselect="snippet, i: result_message.line_snippet_array">
  <span jscontent="'snippet'+(1+i)+'of'+total">
    Text here is replaced with "snippet X of Y"
  </span>
  <div use="line_snippet_file.html#line_snippet_template">
    Text here is replaced with transcluded and processed template.
  </div>
  </div>
  </div>
</html>

In an embodiment, node 402 in AST 400 is a root node and includes the open <html> tag. The remaining nodes in AST 400 include HTML elements, custom attributes and expressions that are enclosed between the open <html> HTML tag and the close </html> tag.

In an embodiment, node 404 in AST 400 is the only child of node 402, as the <html> HTML tag includes one <div> HTML tag between the open and close tags. Node 404 includes a <div> HTML tag. In addition, node 404 also includes an AST tag described above. The AST tag indicates that node 404 is an entry point for template "result_template," and is associated with template class ResultTemplate that code generator 225 generated for template "result_template."

In an embodiment, node 404 has two child nodes, nodes 406*a* and 406*b*. Node 406*a* includes a textual expression "Snippets". A text expression indicates to interpreter 109 to include the textual expression into the valid HTML document, during execution.

Node 406*b* includes a <div> HTML tag. In an embodiment, node 406*b* includes four child nodes. One of those nodes is node 408 that includes a <span> HTML tag. Node 408, includes one child node, node 410 that is a custom attribute "jscontent." Because node 408 represents a custom attribute, node 408 includes an AST tag that represents to interpreter 109, during execution, that there are processing directives associated with node 408.

In an embodiment, node 410 includes an AST sub tree 412 that includes a mathematical expression that will be appreciated by a person skilled in the art.

In an embodiment, node 414 includes an input parameters "Snippet" and "i", along with the AST tag. The AST tag in node 414 indicates to interpreter 109 to process instructions associated with processing input parameters.

In an embodiment, node 414 includes another AST tag that indicates that AST tree 416*a* and AST tree 416*b* are associated with node 414. AST tree 416*a* includes protocol buffer "line_snippet_array." AST tree 416*b* includes protocol buffer "result_message". AST tags indicate to interpreter 109 to traverse AST tree 416*a* and 416*b* during execution. As described herein, interpreter 109 retrieves input data 108 from AST tree 208 that include protocol buffer using an offset representation, as described herein.

In an embodiment, node 418 includes a function Size( ). Node 418 indicates to the interpreter 109 to execute function size( ), during execution.

Going back to FIG. 2, in an embodiment, template class 210 includes a method that accesses AST 208 associated with template class 210. Template class 210 uses the method to retrieve AST 208 during runtime. In an embodiment, template class 210 verifies that the retrieved AST 208 is associated with template class 210.

Once created, in one embodiment, ASTs 208, template objects 211 and front end rendering object 213 may be uploaded to web server 104 or another computing device that includes interpreter 109.

System memory 214 stores compiled objects and other computing applications on a computing device. For example, once template building module 204 generates template objects 211 and abstract syntax trees 208, they may be stored in system memory 214 before being uploaded to web server 104. In another example, system memory 214 may store protocol buffer messages 218 and front end rendering object 213.

FIG. 5 is a block diagram 500 of an interpreter generating a valid HTML document on a web server. Block diagram 400 includes interpreter 109, AST 208, protocol buffer message 218, template object 211 and front end rendering object 213.

When web server 104 receives an HTTP request 502 for webpage 116, web server 104 passes the HTTP request 502 to frontend rendering object 213. In response to the HTTP request 502, frontend rendering object 213 retrieves input data 108. In an embodiment, input data 108 may be stored on web server 104 or on, for example, backend server 114 that communicates with web server 104 using network 102.

After front end rendering object 213 retrieves input data 108, front end rendering object 213 passes input data 108 to template object 211 using protocol buffer message 218. For example, front end rendering object 213 passes protocol buffer message 218 to template object 211 by executing template object's 211 Fill( ) method.

After front end rendering object 213 passes protocol buffer message 218 to template object 211, front end rendering object 213 renders HTML output stream 504 by executing the Render( ) method. For example, when front end rendering object 213 executes the Render( ) method, template object 211 passes protocol buffer message 218 and the associated AST 208 to interpreter 109.

Interpreter 109 traverses AST 208 and generates HTML output stream 504 as it traverses each node in AST. In an embodiment, interpreter 109 begins the traversal at a root node. In an embodiment, traversal is an in-order traversal. When interpreter 109 traverses to a node that includes a textual expression, interpreter 109 includes the textual expression in the HTML output stream 504.

In an embodiment, when interpreter 109 traverses to a control node, such as the node that includes a custom attribute, interpreter executes the processing directives associated with the particular custom attribute. If the node includes an AST tag, interpreter 109 process the instructions included in the AST tag. If the AST tag indicates to interpreter 109 that another AST 208 is associated with the node, interpreter 109 traverses the associated AST 208 before proceeding to the next node in original AST 208.

In an embodiment, when interpreter 109 traverses the node that includes a function, interpreter 109 evaluates the function.

In an embodiment, based on the evaluation in each control node, interpreter 109 determines whether to proceed to the child node associated with the control node or to proceed to a sibling node in AST 208.

In an embodiment, based on the evaluation of each control node, interpreter determines whether to generate HTML output stream 504. In an embodiment, when a node includes custom attributes, interpreter 109 determines whether to include a custom attribute and its processing directives as part of HTML output stream 504*b*.

In an embodiment, interpreter 109 may execute on client 106. Client 106 may activate interpreter 109 when a user opens template file 202 using a file managing application, such as WINDOWS EXPLORER or APPLE FINDER. When executing on client 106, interpreter 109 may also make a request to retrieve input data 108 from storage are located on client 106 and proceed as described herein.

After interpreter 109 renders HTML output stream 504, interpreter 109 sends HTML output stream 504 to browser 110. The HTML output stream 504 generates a valid HTML document that browser 110 displays as webpage 116.

In an embodiment, HTML output stream 504 is output stream 504*a*. Output stream 504*a* includes valid HTML syntax and input data 108. When browser 110 receives output stream 504*a*, browser 110 displays webpage 116 on a display screen of client 106. With HTML output stream 504*a*, browser 110 makes another HTTP request to web server 104 to update webpage 116, and, in response receives another output stream 504 with updated input data 108.

In another embodiment, HTML output stream 504 is output stream 504*b*. Output stream 504*b* includes custom attributes included in output stream 504*b*. Included, custom attributes do not interfere with browser 110 displaying webpage 116 on the display screen. The included custom attributes allow browser 110 to issue update request to update input data 108. For example, custom attribute may include a remote procedure call (RPC) function. Interpreter 109 installed on browser 110, as described herein, can execute the RPC and issue an RPC request for updated input data 108 to web server 104. In an embodiment, browser 110 makes an RPC service call using asynchronous JavaScript and XML (AJAX) applications. In response to the RPC request, web server 104 sends input data 108 to client 106. Once client 106 receives input data 108, interpreter 109 inserts the input data 109 into webpage 116, without re-rendering the webpage.

FIG. 6 is a flowchart of a method 600 for generating an abstract syntax tree and compiled template objects, according to an embodiment.

At stage 602, a template file is accessed and parsed. For example, template building module 204 accesses template file 202 and invokes parser 224 to parse the HTML elements and templates 201 included in template file 202. If parser 224 finds an error in template file 202, the flowchart ends.

At stage 604, template objects are build and compiled from templates included in template file. For example, optimizer 225 optimizes the code in template 201 before code generator 226 builds template classes 210 for each template 201 included in template file 202, as described herein. In an embodiment, compiler 228 compiles template classes 210 into template objects 211.

At stage 606, an abstract syntax tree is generated. For example, code generator 226, traverses template file 202 and builds AST 208 from the HTML tags, expressions, processing instruction, functions and custom attributes as described herein. In an embodiment, code generator 226 generates a node for each HTML element, with children of the node being HTML tags, text expressions, etc., that are inside the HTML element, as described herein. When code generator 226 encounters a custom attribute, code generator 226 may attach an AST tag to the node. In an embodiment, the AST tag can contain processing instructions, instructions to process custom attributes or a function call to another AST 208, as described herein.

In an embodiment, at stage 606, code generator 226 builds AST 208 for each protocol buffer message 218 included in template 201. In an embodiment, AST 208 that includes protocol buffer message 218 is indicated by an AST tag that is included in a control node of an AST that represents template file 202.

At stage 608, front end rendering object is generated. For example, after developer has written the front end rendering code 212 for templates 201, front end rendering object 213 is generated using a C++ or another compiler from the front end rendering code 212, as described herein. Stage 608, may be performed prior to, during or after the template object building and compilation process.

When template objects of stage 606 and front end rendering object of stage 608 are generated, they may be uploaded, to, for example, web server 104.

FIG. 7 is a flowchart of an exemplary method 700 for generating a valid HTML document using a web server, according to an embodiment.

At stage 702, a web server 104 receives an HTTP request from a browser 110.

At stage 704, input data is retrieved from storage. For example, front end rendering object 213 issues a request to retrieve input data 108 from web server 104 or back end server 114, and, in response, receives input data 108 in a form of protocol buffer message 218.

At stage 706, front end rendering object passes input data to template objects. For example, front end rendering object 213 passes protocol buffer message 218 received in stage 804 to template object 211 using the Fill( ) method.

At stage 708, front end rendering object begins the rendering process. For example, front end rendering object 213 executes the template object's 211 Render( ) method. When the Render( ) method is executed, template object 211 passes protocol buffer message 218 received in stage 706 and AST 208 associated with template object 211 to interpreter 109.

At stage 710, interpreter generates an HTML output stream that produces a valid HTML document. For example, interpreter 109 traverses AST 208 as described herein and generates an HTML output stream 504. FIG. 8, is an exemplary method for interpreter traversing AST 208 and generating a valid HTML document.

At stage 712, the valid HTML document is sent to a browser. For example, web server 104 sends HTML output stream 404 back to browser 110.

At stage 714, browser displays the valid HTML document. For example, browser 110 displays the valid HTML document on a display screen of client 106.

FIG. 8 is an exemplary method 800 for traversing an AST according to an embodiment. A person skilled in the art will appreciate that steps 804-812 are exemplary and may be performed in any order.

At stage 802, interpreter 109 begins to traverse a root node in AST 208.

At stage 804, an interpreter processes an expression node. For example, interpreter 109 traverses to an expression node in AST 208. Interpreter 190 determines that the node is an expression node, and retrieves the textual expression included in the node. Interpreter 109 includes the textual expression in the HTML output stream 504.

At stage 806, an interpreter processes a control node that includes a custom attribute. For example, interpreter 109 traverses to a control node in AST 208 and identifies that the control node includes a custom attribute. Interpreter 109 retrieves the process instructions required for processing a particular custom attribute included in AST node and processes the instructions. Based on the instructions, interpreter 109 proceeds to the next node in AST 208 and/or generates an HTML output stream 504.

At stage 808, an interpreter processes a control node that includes processing instructions. For example, interpreter 109 traverses to a control node in AST 208 and determines that the node includes processing instructions. Interpreter 109 evaluates the instructions. Based on the results of the evaluation, interpreter 109 proceeds to the next node in AST 208 and/or generates an HTML output stream 504.

At stage 810, an interpreter processes a control node that includes a function. For example, interpreter 109 traverses to a control node that includes a function and evaluates the function. Based on the results of the evaluation, interpreter 109 proceeds to the next node in AST 208 and/or generates an HTML output stream 504.

At stage 812, an interpreter determines that a control node includes an AST tag. When interpreter 109, determines that there is an AST tag included in the node, interpreter 109 evaluates the instruction in the AST tag. In an embodiment, if the AST tag indicates that another AST 208 is associated with the node, such as AST 208 that includes protocol buffer message 218. When the AST tag indicates that another AST 208 exists, interpreter 109 traverses the nodes in the other AST 208 before traversing to the next node in the original AST.

FIG. 9 is a block diagram of an example computer system 900 in which embodiments of the present invention, or portions thereof, may be implemented as computer-readable code. For example, the components or modules of system 100 may be implemented in one or more computer systems 900 using hardware, software, firmware, tangible computer-readable media having instructions stored thereon, or a combination thereof and may be implemented in one or more computer systems or other processing systems. Hardware, software, or any combination of such may embody any of the modules and components in FIGS. 1-7.

Web server 104 and client 106 can include one or more computing devices. According to an embodiment, web server 104 and client 106 can include one or more processors 902, one or more non-volatile storage mediums 904, one or more memory devices 906, a communication infrastructure 908, a display screen 910 and a communication interface 912. Processors 902 can include any conventional or special-purpose processor, including, but not limited to, digital signal processor (DSP), field programmable gate array (FPGA), and application-specific integrated circuit (ASIC). Non-volatile storage 904 can include one or more of a hard disk drive, flash memory, and like devices that can store computer program instructions and data on computer readable media. One or more of non-volatile storage device 904 can be a removable storage device. Memory devices 906 can include one or more volatile memory devices such as, but not limited to, random access memory. Communication infrastructure 908 can include one or more device interconnection buses such as Ethernet, Peripheral Component Interconnect (PCI), and the like.

Typically, computer instructions executing on web server 104 or client 106 are executed using one or more processors 602 and can be stored in non-volatile storage medium 904 or memory devices 906.

Display screen 910 allows results of the computer operations to be displayed to a user or an application developer.

Communication interface 912 allows software and data to be transferred between computer system 900 and external devices. Communication interface 912 may include a modem, a network interface (such as an Ethernet card), a communications port, a PCMCIA slot and card, or the like. Software and data transferred via communication interface 912 may be in the form of signals, which may be electronic, electromagnetic, optical, or other signals capable of being received by communication interface 912. These signals may be provided to communication interface 912 via a communications path. Communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for generating a valid HTML document, comprising:
    providing an abstract syntax tree, the abstract syntax tree including a plurality of nodes, each node in the plurality of nodes representing an element in a template file, in response to receiving a request on a web server for a webpage;
    traversing the abstract syntax tree;
    for each node in the abstract syntax tree:
        determining a type of the node; and
        performing an action based on the determined node type using one or more compiled template objects generated from one or more templates in the template file;
    generating the valid HTML document based on the plurality of actions determined by traversing the abstract syntax tree on the web server, to send to display the webpage on a browser, wherein the valid HTML document is type-defined; and
    sending the valid HTML document for display on the browser.

2. The computer-implemented method of claim 1, wherein the type of the node is an expression node and performing the action comprises:
    inserting a textual expression associated with the node into the valid HTML document.

3. The computer-implemented method of claim 1, wherein the type of the node is a control node and performing the action further comprises:
    evaluating a content included in the control node;
    determining a result based on the evaluating; and
    performing a further action based on the result, the further action including an alternative of proceeding to another node or generating a textual expression.

4. The computer-implemented method of claim 3, wherein the control node includes an AST tag.

5. The computer-implemented method of claim 4, wherein evaluating further comprises evaluating instructions included in the AST tag.

6. The computer-implemented method of claim 5, wherein the AST tag indicates a traversal of another abstract syntax tree.

7. The computer-implemented method of claim 3, wherein the control node includes a custom attribute.

8. The computer-implemented method of claim 3, wherein the evaluating further comprises:
    retrieving input data from a protocol buffer.

9. The computer-implemented method of claim 1, further comprising:
    generating the abstract syntax tree from a plurality of elements and a plurality of instructions in the template file.

10. A system for generating a valid HTML document, comprising:
    a memory configured to store an abstract syntax tree, the abstract syntax tree including a plurality of nodes, each node in the plurality of nodes representing an element in a template file;
    an interpreter configured to:
    traverse the abstract syntax tree in response to receiving a request on a web server for a webpage;
        for each node in the abstract syntax tree:
            determining a type of the node; and
            perform an action based on the determined node type using one or more compiled template objects generated from one or more templates in the template file;
        generate the valid HTML document based on the plurality of actions determined by traversing the abstract syntax tree on the web server, to send to display the webpage on a browser, wherein the valid HTML document is type-defined.

11. The system of claim 10, wherein the type of the node is an expression node and the interpreter is further configured to:
    insert a textual expression associated with the node into the valid HTML document.

12. The system of claim 10, wherein the node in the plurality of nodes includes an AST tag.

13. The system of claim 10, wherein the type of the node is a control node and the interpreter is further configured to:
    evaluate a content included in the control node;
    determine a result based on the evaluating; and
    perform a further action based on the result, the further action including an alternative of proceeding to another node or generating a textual expression.

14. The system of claim 10, wherein the control node includes an AST tag.

15. The system of claim 10, further comprising:
    a parser configured to generate the abstract syntax tree from a plurality of elements and a plurality of instructions in the template file.

16. An article of manufacture including a computer-readable medium having instructions stored thereon that, when executed by a computing device, cause the computing device to perform operations for generating a valid HTML document, comprising:
 providing an abstract syntax tree, the abstract syntax tree including a plurality of nodes, and each node in the plurality of nodes representing an element in a template file, in response to receiving a request on a web server for a webpage;
 traversing the abstract syntax tree;
 for each node in the abstract syntax tree:
  determining a type of the node; and
  performing an action based on the determined node type using one or more compiled template objects generated from one or more templates in the template file;
 generating the valid HTML document based on the plurality of actions determined by traversing the abstract syntax tree on the web server, to send to display the webpage on a browser, wherein the valid HTML document is type-defined; and
 sending the HTML output stream for display on the browser.

17. The computer-readable medium of claim 16, wherein the type of the node is an expression node and
 wherein the instructions that cause the computing device to determine the node type also include instructions that, when executed by the computing device, cause the computing device to perform operations comprising inserting a textual expression associated with the node into the valid HTML document.

18. The computer-readable medium of claim 16, wherein the type of the node is a control node and
 wherein the instructions that cause the computing device to determine the node type also include instructions that, when executed by the computing device, cause the computing device to perform operations comprising:
  evaluating a content included in the control node;
  determining a result based on the evaluating; and
  performing a further action based on the result, the further action including an alternative of proceeding to another node, accessing another abstract syntax tree or generating an HTML expression.

19. The computer-readable medium of claim 16, wherein the control node includes an AST tag.

20. The computer-readable medium of claim 16, wherein the instructions stored thereon that, when executed by a computing device, cause the computing device to perform operations, comprising:
 generating the abstract syntax tree from a plurality of elements and a plurality of instructions in the template file.

\* \* \* \* \*